(12) United States Patent
Takada

(10) Patent No.: US 6,677,578 B2
(45) Date of Patent: Jan. 13, 2004

(54) INTERNAL-SURFACE-SCANNING IMAGE RECORDING APPARATUS

(75) Inventor: Norihasa Takada, London (GB)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 200 days.

(21) Appl. No.: 09/887,343

(22) Filed: Jun. 25, 2001

(65) Prior Publication Data

US 2001/0054678 A1 Dec. 27, 2001

(30) Foreign Application Priority Data

Jun. 26, 2000 (JP) ........................................ 2000-190935

(51) Int. Cl.$^7$ ............................................. G03G 13/04
(52) U.S. Cl. ........................ 250/234; 347/134; 347/260
(58) Field of Search ................................. 250/234, 235, 250/236, 208.1, 216; 347/134, 135, 137, 241, 243, 248, 255, 259, 260, 261; 358/481, 493; 359/216, 220, 221

(56) References Cited

U.S. PATENT DOCUMENTS

| 2,222,937 | A | | 11/1940 | Dimmick |
| 3,809,806 | A | * | 5/1974 | Walker et al. ............... 347/260 |
| 5,363,217 | A | | 11/1994 | Keightley |
| 6,456,396 | B1 | * | 9/2002 | Gershony .................. 358/3.11 |

FOREIGN PATENT DOCUMENTS

| EP | 0506410 A2 | 3/1992 |
| EP | 0701158 A2 | 3/1996 |
| JP | 63193124 | 8/1988 |
| JP | 02084611 | 3/1990 |

OTHER PUBLICATIONS

Picot P A et al: "An In–line Optical Image Translator with Applications in X–ray Videography", Medical Physics, American Institute of Physics. New York, US. vol. 17, NR. 6, Page(s) 983–988 XP000176073 ISSN: 0094–2405 * pp. 984; figure 1 ** p. 986; figure 5 *, 1990.

W. Neil Charman: "Visual Optics and Instrumentation" 1991, The Macmillan Press Ltd, England XP002240331 1 * p. 377; figure 17.8 ** p. 378; figure 17.9 *.

R. Kingslake; B. J. Thompson: "Applied Optics and Optical Engineering" 1980, Academic Press, New York SP002240330 6 * p. 252; figure 41 *.

* cited by examiner

Primary Examiner—Kevin Pyo
(74) Attorney, Agent, or Firm—Sughrue Mion, PLLC

(57) ABSTRACT

A light beam modulated with image information has its optical axis moved in a given direction by a light beam moving unit, and reflected successively by a plurality of rotating reflecting mirrors of a spinner to a photosensitive medium. The movement of the light beam which is caused by the light beam moving unit is controlled depending on the speed at which the reflecting mirrors move and the direction in which the reflecting mirrors move, so that the light beam reflected by each of the reflecting mirrors can scan the photosensitive medium. An image represented by the image information can efficiently be recorded on the photosensitive medium.

18 Claims, 18 Drawing Sheets

INTERNAL-SURFACE-SCANNING IMAGE RECORDING APPARATUS

BACKGROUND OF THE INVENTION

1. Field of the Invention

The present invention relates to an internal-surface-scanning image recording apparatus for recording an image on a photosensitive medium held against the inner circumferential surface of a drum in the form of a partly cylindrical body, by scanning the photosensitive medium with a light beam that has been modulated by image information.

2. Description of the Related Art

Apparatus for recording an image on a photosensitive medium with a laser beam include a planar-surface-scanning image recording apparatus for applying a laser beam in a main scanning direction to a planar photosensitive medium which is being fed in an auxiliary scanning direction to record an image on the planar photosensitive medium, an external-surface-scanning image recording apparatus for applying a laser beam to a photosensitive medium mounted on the outer circumferential surface of a drum which is being rotated to record an image on the photosensitive medium, and an internal-surface-scanning image recording apparatus for applying a laser beam to a photosensitive medium mounted on the inner circumferential surface of a drum which is being rotated to record an image on the photosensitive medium. The internal-surface-scanning image recording apparatus is in widespread usage because the photosensitive medium mounted on the inner circumferential surface of the drum is prevented from being peeled off during a recording process, the recorded image has high dimensional accuracy, and the apparatus is capable of high-speed scanning and is highly economical.

FIG. 1 of the accompanying drawings schematically shows a conventional internal-surface-scanning image recording apparatus 2. As shown in FIG. 1, the internal-surface-scanning image recording apparatus 2 has a semicylindrical drum 4 with a photosensitive medium S mounted on its inner circumferential surface, a laser oscillator 6 for emitting a laser beam L, and a spinner 8 for scanning the photosensitive medium S with the laser beam L in main and auxiliary scanning directions.

The laser beam L emitted from the laser oscillator 6 is modulated by a modulating means 10 which comprises an acousto-optical modulator or the like for modulating the laser beam L with image information. Then, the modulated laser beam L passes through lenses 12, 14, is reflected by two reflecting mirrors 16, 18, and is applied to the spinner 8 by a condensing lens 20. The spinner 8 has a reflecting mirror 22 which is rotated about the central axis of the semicylindrical drum 4 to reflect the laser beam L and scans the photosensitive medium S with the laser beam L in the main scanning direction. At the same time, the spinner 8 moves in the auxiliary scanning direction along the central axis of the semicylindrical drum 4. In this manner, the image represented by the image information which has modulated the laser beam L is two-dimensionally recorded on the photosensitive medium S.

In the conventional internal-surface-scanning image recording apparatus 2, because the image is recorded on the photosensitive medium S only when the reflecting mirror 22 of the spinner 8 faces the photosensitive medium S, the laser beam L which is reflected by the reflecting mirror 22 when the reflecting mirror 22 of the spinner 8 does not face the photosensitive medium S is wasted. The conventional internal-surface-scanning image recording apparatus 2 cannot record the image at a high speed because the photosensitive medium S is scanned only in one cycle while the spinner 8 makes one revolution.

The above drawbacks may be overcome by using a cylindrical drum instead of the semicylindrical drum 4 to utilize the laser beam L effectively for increased exposure efficiency. However, it is difficult to attach the photosensitive medium S to and remove the photosensitive medium S from the cylindrical drum. Particularly, if an image is to be recorded on a printing plate, then the photosensitive medium S which is highly rigid needs to be curved to a large curvature, and may possibly be damaged when it is curved. Therefore, it is a time-consuming process to attach the photosensitive medium S to and remove the photosensitive medium S from the cylindrical drum, with the result that high-speed image recording cycles cannot be achieved.

High-speed image recording may be performed by increasing the speed at which the spinner 8 rotates. The spinner 8 is of an asymmetrical shape because the reflecting mirror 22 thereof is inclined at about 45° to the axis about which the spinner 8 rotates. As a consequence, when the spinner 8 rotates, it tends to suffer rotational speed irregularities, and the reflecting mirror 22 may be deformed under centrifugal forces. When the spinner 8 rotates at a high speed, it is liable to produce noise and heat. These problems can be solved by reducing the size of the reflecting mirror 22. The reflecting mirror 22 of the reduced size, however, has a reduced area for receiving the laser beam L, and thus is unable to apply a sufficient amount of light energy to the photosensitive medium S. As a result, the resolution of the image is lowered, and also the quality of the image is lowered.

SUMMARY OF THE INVENTION

It is a general object of the present invention to provide an internal-surface-scanning image recording apparatus which is capable of recording an image at a high speed with a high level of accuracy on a photosensitive medium.

A major object of the present invention is to provide an internal-surface-scanning image recording apparatus which allows a photosensitive medium to be attached to and from a drum easily and efficiently for high-speed image recording on the photosensitive medium.

Another object of the present invention is to provide an internal-surface-scanning image recording apparatus which is capable of effectively utilizing a light beam to record an image on a photosensitive medium.

Still another object of the present invention is to provide an internal-surface-scanning image recording apparatus which can record an image on a photosensitive medium at a high speed without having to rotate a spinner at a high speed.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
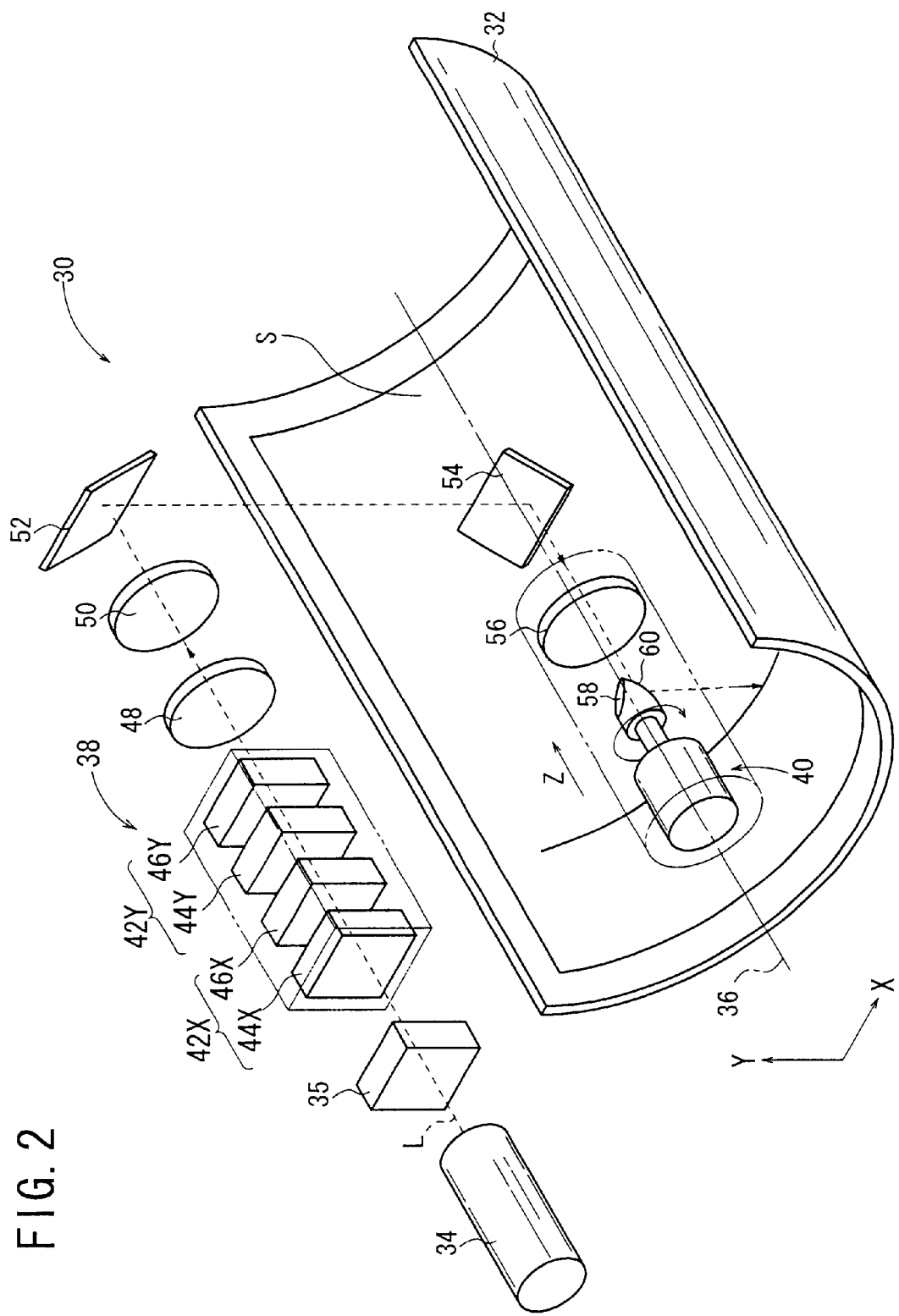
FIG. 2 is a perspective view of an internal-surface-scanning image recording apparatus according to an embodiment of the present invention.
Figure 3:
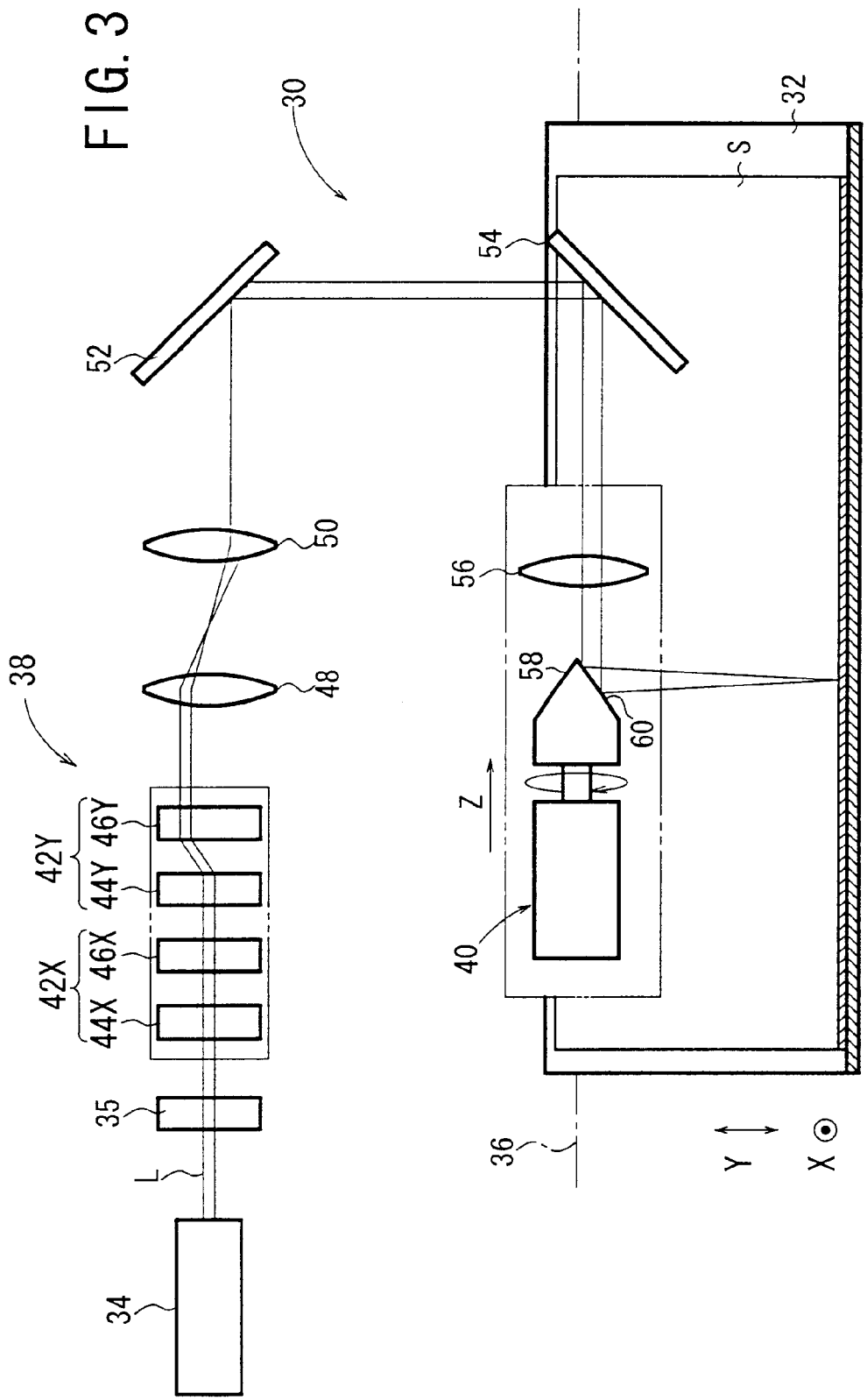
FIG. 3 is a sectional side elevational view of the internal-surface-scanning image recording apparatus shown in FIG. 2.

FIGS. 2 and 3 show an internal-surface-scanning image recording apparatus 30 according to an embodiment of the present invention.

As shown in FIGS. 2 and 3, the internal-surface-scanning image recording apparatus 30 generally comprises a semicylindrical drum 32 with a photosensitive medium S mounted on an inner circumferential surface thereof, a laser oscillator 34 for emitting a laser beam L, a modulator 35 for modulating the laser beam L with image information, a beam shifter 38 (light beam moving means) for shifting the optical axis of the laser beam L within a plane perpendicular to the axis 36 of the semicylindrical drum 32, and a spinner 40 for scanning the photosensitive medium S with the laser beam L in main and auxiliary scanning directions.

The semicylindrical drum 32 angularly extends an angle of about 180° about the axis 36 thereof. It is assumed that the Z direction along the axis 36 of the semicylindrical drum 32 is also referred to as an auxiliary scanning direction, and an X direction (first direction) and a Y direction (second direction) which are perpendicular to the axis 36 of the semicylindrical drum 32 are also referred to as a main scanning direction.

The modulator 35 controls or turns on and off the intensity of the laser beam L according to an electric signal depending on the image information. The modulator 35 may comprise an acousto-optical modulator (AOM) or an electro-optical modulator (EOM) or the like. If the laser oscillator 34 comprises a laser diode, then the modulator 35 is not required because the laser diode can directly be modulated by the electric signal depending on the image information.

The beam shifter 38 comprises an X shifting module 42X (first moving means) and a Y shifting module 42Y (second moving means). The X shifting module 42X adjusts the position where the laser beam L is applied to the spinner 40 in the X direction. The Y shifting module 42Y adjusts the position where the laser beam L is applied to the spinner 40 in the Y direction. The X shifting module 42X comprises a first shifting device 44X and a second shifting device 46X for translating the laser beam L in the X direction in parallel with the axis. The Y shifting module 42Y comprises a first shifting device 44Y and a second shifting device 46Y for translating the laser beam L in the Y direction in parallel with the axis. Each of the first shifting device 44X, the second shifting device 46X, the first shifting device 44Y, and the second shifting device 46Y controls the diffracted direction of the emitted laser beam L according to an electric signal applied thereto, and may comprise, for example, an acousto-optical deflector (AOD) or an electro-optical deflector (EOD) as same as the modulator 35. A beam expander comprising lenses 48, 50 is disposed downstream of the beam shifter 38. Reflecting mirrors 52, 54 for deflecting the laser beam L through 180° are disposed downstream of the lens 50.

The laser beam L that is reflected by the reflecting mirror 54 is applied via a condensing lens 56 to the spinner 40. The spinner 40 has two reflecting surfaces 58, 60 rotatable about the axis 36 of the semicylindrical drum 32. The reflecting surfaces 58, 60 are disposed symmetrically with respect to the axis 36 of the semicylindrical drum 32.

Figure 4:
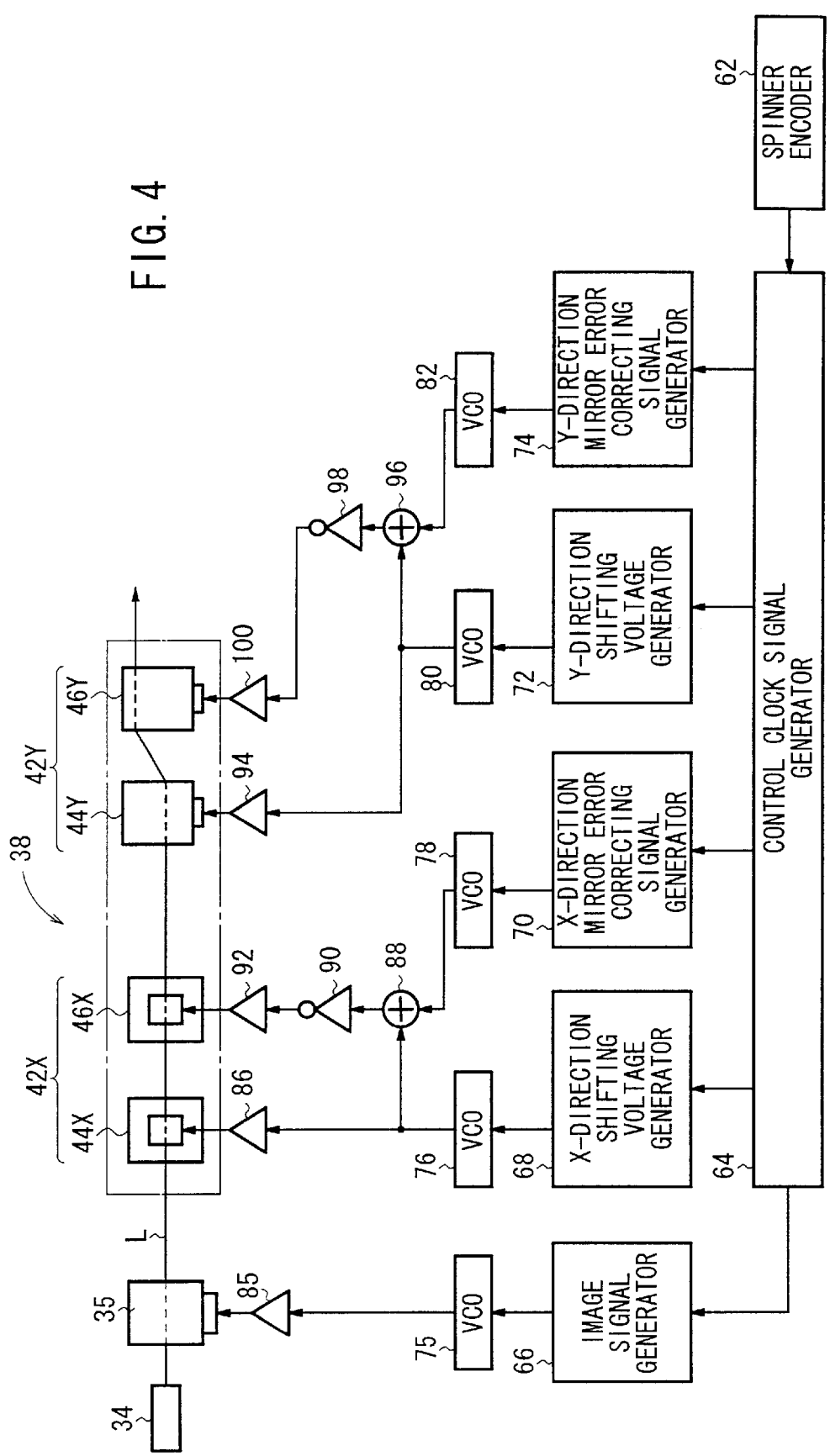
FIG. 4 is a block diagram of a control system for the internal-surface-scanning image recording apparatus shown in FIG. 2.

FIG. 4 shows in block form a control system for the internal-surface-scanning image recording apparatus 30 shown in FIG. 2 and FIG. 3. As shown in FIG. 4, the control system comprises a control clock signal generator 64 for generating a control clock signal based on an angular position signal from a spinner encoder 62 which represents the angular displacement of the spinner 40, an image signal generator 66 for generating an image signal based on the control clock signal from the control clock signal generator 64, an X-direction shifting voltage signal generator 68 for generating an X-direction shifting voltage signal based on the control clock signal from the control clock signal generator 64, an X-direction mirror error correcting signal generator 70 for generating an X-direction mirror error correcting signal based on the control clock signal from the control clock signal generator 64, a Y-direction shifting voltage signal generator 72 for generating a Y-direction shifting voltage signal based on the control clock signal from the control clock signal generator 64, and a Y-direction mirror error correcting signal generator 74 for generating a Y-direction mirror error correcting signal based on the control clock signal from the control clock signal generator 64.

Voltage-controlled oscillators 75, 76, 78, 80, 82 are connected respectively to the image signal generator 66, the X-direction shifting voltage signal generator 68, the X-direction mirror error correcting signal generator 70, the Y-direction shifting voltage signal generator 72, and the Y-direction mirror error correcting signal generator 74.

A frequency modulation signal outputted from the voltage-controlled oscillator 75 is supplied via an amplifier 85 to the modulator 35 to modulate the laser beam L emitted from the laser oscillator 34 with the image signal from the image signal generator 66. A frequency modulation signal outputted from the voltage-controlled oscillator 76 is supplied via an amplifier 86 to the first shifting device 44X. A frequency modulation signal outputted from the voltage-controlled oscillator 78 is added to the frequency modulation signal outputted from the voltage-controlled oscillator 76 by an adder 88, which applies a sum signal to an inverter 90. The inverter 90 inverts the polarity of the applied signal, and supplies the inverted signal via an amplifier 92 to the second shifting device 46X. A frequency modulation signal outputted from the voltage-controlled oscillator 80 is supplied via an amplifier 94 to the first shifting device 44Y. A frequency modulation signal outputted from the voltage-controlled oscillator 82 is added to the frequency modulation signal outputted from the voltage-controlled oscillator 80 by an adder 96, which applies a sum signal to an inverter 98. The inverter 98 inverts the polarity of the applied signal, and supplies the inverted signal via an amplifier 100 to the second shifting device 46Y.

Operation of the internal-surface-scanning image recording apparatus 30 thus constructed will be described below with reference to FIGS. 5 through 7.

The laser beam L emitted from the laser oscillator 34 is applied to the modulator 35, which turns on and off the laser beam L based on image information. Specifically, the spinner encoder 62 supplies the angular position signal which represents the angular displacement of the spinner 40 to the control clock signal generator 64. The control clock signal generator 64 generates a control clock signal from the supplied angular position signal, and supplies the generated control clock signal to the image signal generator 66. Based on the control clock signal, the image signal generator 66 outputs an image signal depending on the position where the photosensitive medium S is scanned by the laser beam L to the voltage-controlled oscillator 75. The voltage-controlled oscillator 75 generates a frequency modulation signal depending on the supplied image signal, and controls the modulator 35 via the amplifier 85 with the generated frequency modulation signal. As a result, the laser beam L is turned on and off depending on the image information and supplied to the beam shifter 38.

In the beam shifter 38 supplied with the laser beam L thus turned on and off, the X shifting module 42X shifts the laser beam L in the X direction by a distance Xd with respect to the axis 36 of the semicylindrical drum 32. Specifically, the X-direction shifting voltage signal generator 68 that is supplied with the control clock signal from the control clock signal generator 64 generates an X-direction shifting voltage signal depending on the orientation of the reflecting mirrors 58, 60, and outputs the generated X-direction shifting voltage signal to the voltage-controlled oscillator 76. The voltage-controlled oscillator 76 generates a frequency modulation signal from the supplied X-direction shifting voltage signal, and supplies the generated frequency modulation signal via the amplifier 86 to the first shifting device 44X. The first shifting device 44X, which comprises an AOD or an EOD, diffracts the laser beam L by a given angle in the X direction, and supplies the diffracted laser beam L to the second shifting device 46X.

Based on the control clock signal from the control clock signal generator 64, the X-direction mirror error correcting signal generator 70 generates an X-direction mirror error correcting signal for correcting an error of a set angle of the reflecting mirrors 58, 60 in the X direction and supplies the X-direction mirror error correcting signal to the voltage-controlled oscillator 78. The voltage-controlled oscillator 78 generates and supplies a frequency modulation signal depending on the supplied X-direction mirror error correcting signal via the adder 88, the inverter 90, and the amplifier 92 to the second shifting device 46X. The adder 88 has been supplied with the frequency modulation signal based on the X-direction shifting voltage signal from the voltage-controlled oscillator 76. Therefore, the second shifting device 46X is supplied with the frequency modulation signal which has been inverted in polarity by the inverter 90 and corrected for the error of the set angle of the reflecting mirrors 58, 60 in the X direction. As a result, the laser beam L applied to the second shifting device 46X is diffracted in the X direction opposite to the laser beam L diffracted by the first shifting device 44X, and corrected for the error of the set angle of the reflecting mirrors 58, 60 in the X direction. The laser beam L thus diffracted and corrected is outputted from the second shifting device 46X.

Therefore, the X shifting module 42X translates the applied laser beam L by the distance Xd in the X direction depending on the angular displacement of the reflecting mirrors 58, 60, and corrects the shifted distance of the laser beam L for the error of the set angle of the reflecting mirrors 58, 60.

Then, the laser beam L is applied to the Y shifting module 42Y of the beam shifter 38. In the Y shifting module 42Y, the first shifting device 44Y and the second shifting device 46Y translates the laser beam L by a distance Yd in the Y direction in parallel with the axis depending on the angular displacement of the reflecting mirrors 58, 60, and correct the shifted distance of the laser beam L for the error of the set angle of the reflecting mirrors 58, 60.

The laser beam L thus shifted in the X and Y directions depending on the angular displacement of the spinner 40 is then enlarged in beam diameter by the lenses 48, 50, thereafter deflected by the reflecting mirrors 52, 54, and then applied via the condensing lens 56 to the reflecting mirrors 58, 60 of the spinner 40. The reflecting mirrors 58, 60 as they rotate about the axis 36 of the semicylindrical drum 32 alternately reflect the applied laser beam L to the photosensitive medium S, and are moved in the Z direction to record a two-dimensional image on the photosensitive medium S.

Figure 5:
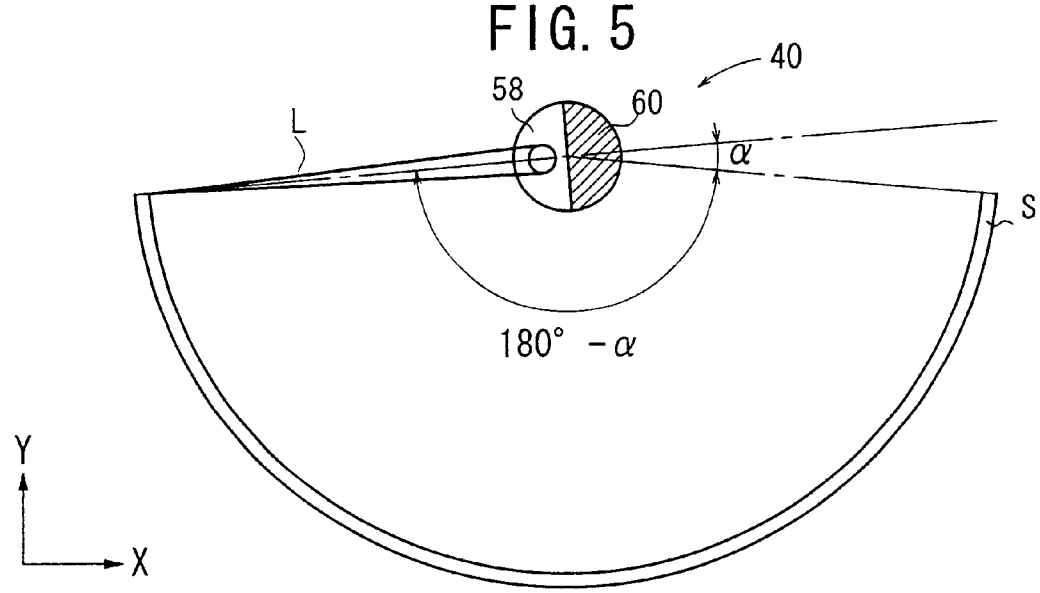
FIG. 5 is a schematic view showing the manner in which a laser beam is deflected in the internal-surface-scanning image recording apparatus shown in FIG. 2.
Figure 6:
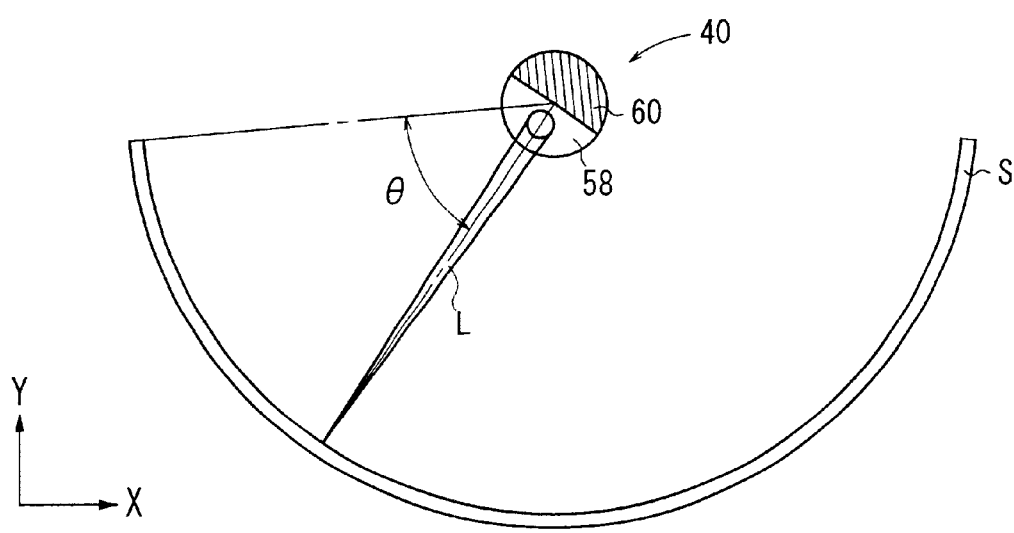
FIG. 6 is a schematic view showing the manner in which the laser beam is deflected in the internal-surface-scanning image recording apparatus shown in FIG. 2.
Figure 7:
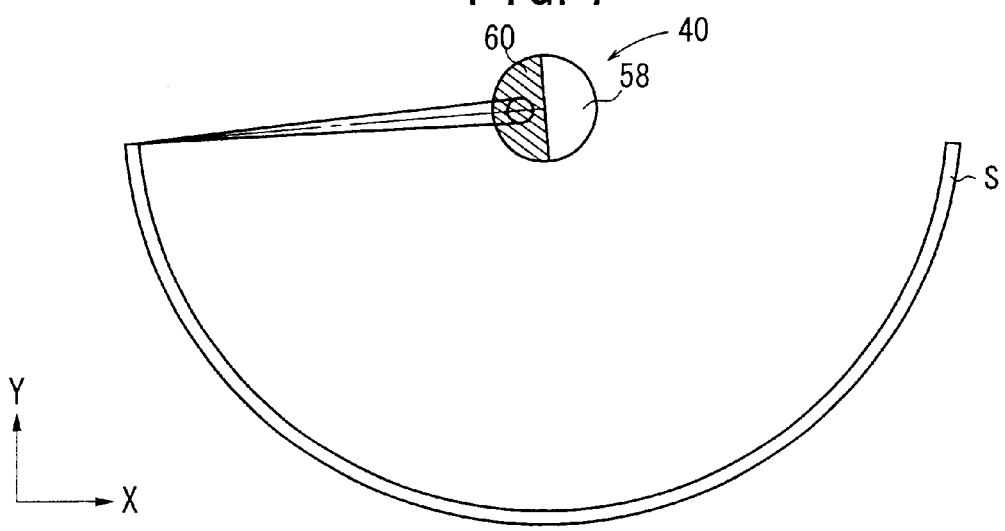
FIG. 7 is a schematic view showing the manner in which the laser beam is deflected in the internal-surface-scanning image recording apparatus shown in FIG. 2.

Specifically, if an image starts being recorded from the state shown in FIG. 5, the reflecting mirror 58 directed to the photosensitive medium S reflects the laser beam L to the photosensitive medium S for thereby recording the image as shown in FIG. 6. During this time, the laser beam L is shifted in the X and Y directions by respective distances Xd, Yd depending on the angular displacement θ of the reflecting mirrors 58, 60, corrected for the angular error of the reflecting mirrors 58, 60, and then applied to the reflecting mirrors 58, 60. Therefore, the laser beam L is reflected by the reflecting mirror 58 at the same position thereon at all times and applied to the photosensitive medium S.

When the reflecting mirror 58 is angularly moved (180°−α), the laser beam L is shifted by the beam shifter 38 to the central position on the reflecting mirror 60. From the state in which the reflecting mirror 58 has been turned 180°, the laser beam L is reflected by the reflecting mirror 60 at the same position thereon and applied to the photosensitive medium S in the same manner as described above as shown in FIG. 7. The angle α is an angle set in view of a period of time required to shift the laser beam L from the central position on the reflecting mirror 58 to the central position on the reflecting mirror 60.

Figure 1:
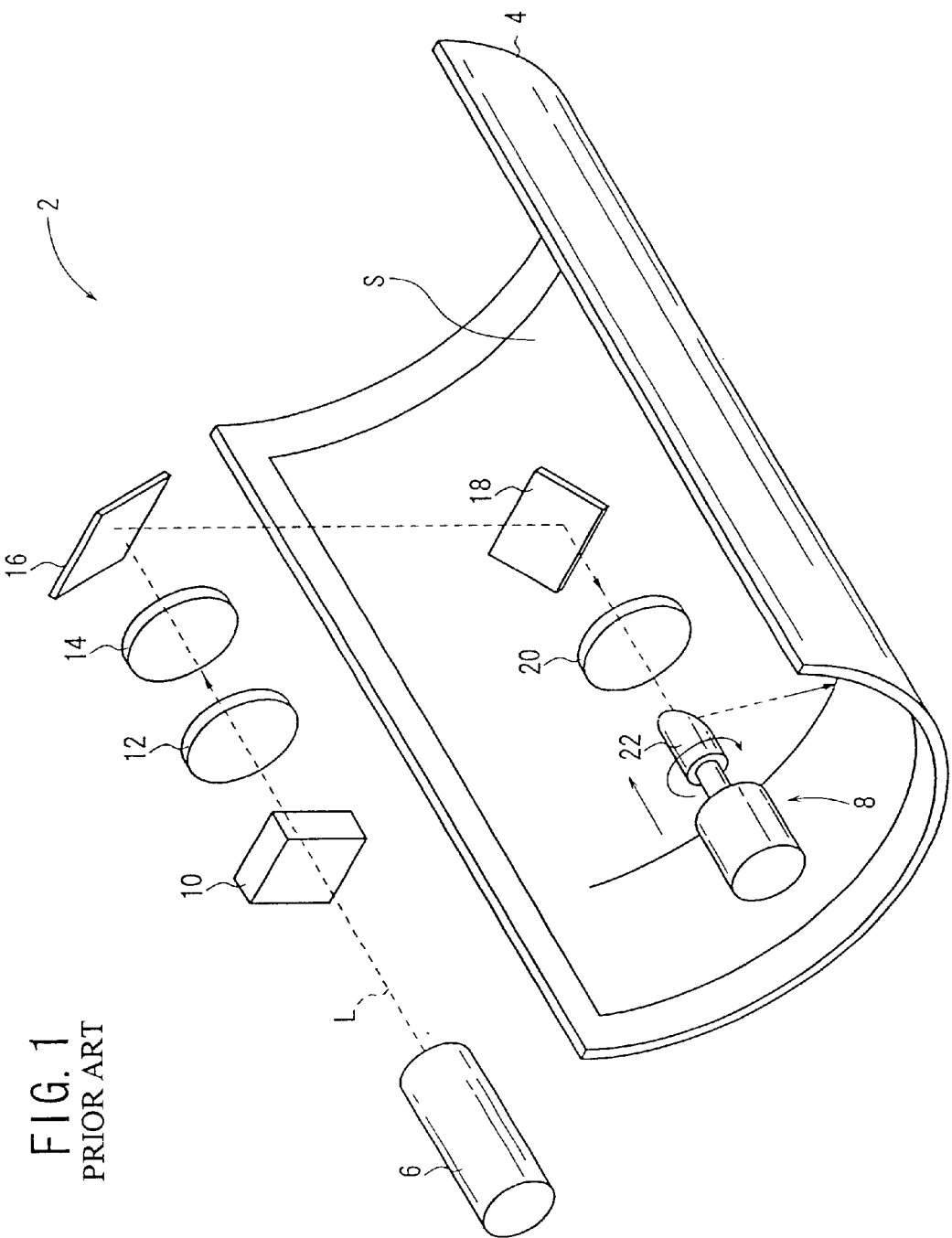
FIG. 1 is a perspective view of a conventional internal-surface-scanning image recording apparatus.

Since the laser beam L scans the photosensitive medium S twice while the reflecting mirrors 58, 60 make one revolution and hence is not unduly wasted, the image can be recorded on the photosensitive medium S in a period of time which is one half of the period of time required when the spinner 8 having the single reflecting mirror 22 shown in FIG. 1, for example, is used. Because the image can be recorded at a rate twice the conventional rate without having to increase the rotational speed of the spinner 40, the reflecting mirrors 58, 60 are not deformed under centrifugal forces and noise and heat are not generated. In addition, inasmuch as the reflecting mirrors 58, 60 are symmetrical with respect to the axis about which the spinner 40 is angularly movable, the spinner 40 does not suffer rotational speed irregularities, and hence can record the image highly accurately at a stable rotational speed. Since the image can be recorded at a high speed without involving an increase in the output power of the laser oscillator 34, the cost of the laser oscillator 34 which is relatively expensive is prevented from increasing particularly when a photosensitive medium of low sensitivity, such as a printing plate material, is used.

The relationship between the distance Xd by which the laser beam L is shifted in the X direction and the distance Yd by which the laser beam L is shifted in the Y direction will be described below. For the sake of brevity, it is assumed that the reflecting mirrors 58, 60 are free of any set angle errors, and the X- and Y-direction mirror error correcting signals are nil.

Figure 8:
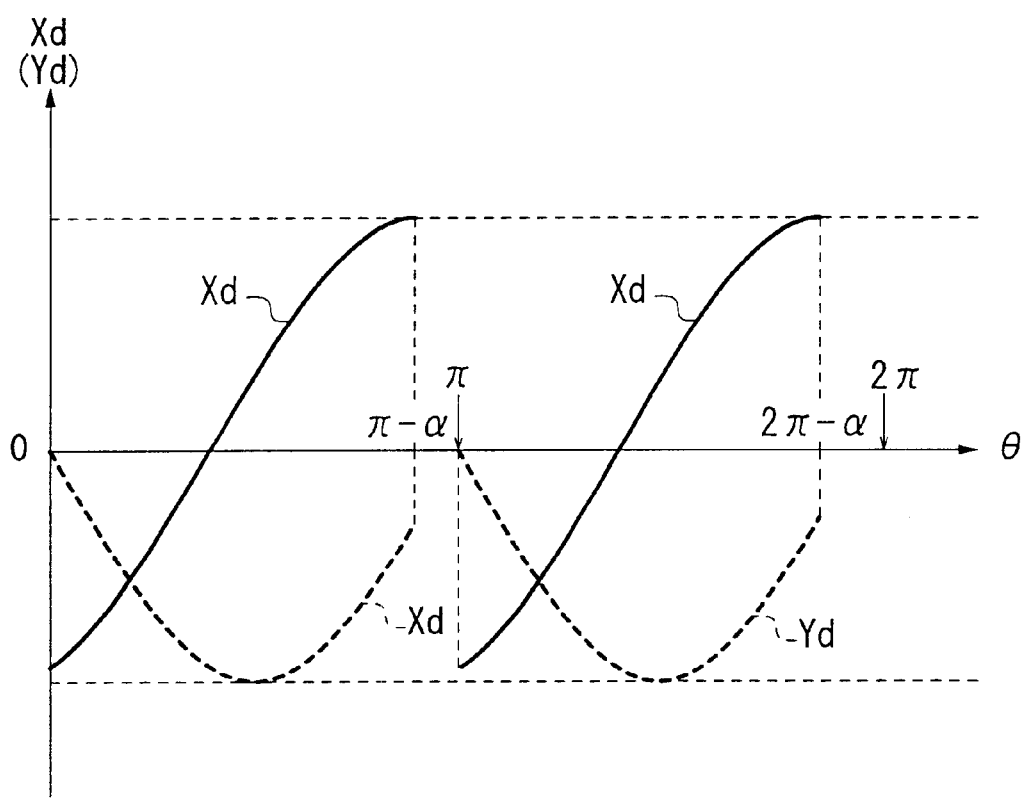
FIG. 8 is a diagram showing the relationship between the angular displacement of a spinner and the displacement of the optical axis of a laser beam in the internal-surface scanning image recording apparatus shown in FIG. 2.

If the reflecting mirrors 58, 60 rotate at a constant angular velocity, then the distances Xd, Yd can be expressed by way of simple harmonic motion. Specifically, if a phase delay angle at the time the laser beam L starts recording an image (θ=θ) is represented by φ and the number of the reflecting mirrors 58, 60 is represented by N (e.g., the reflecting mirror 58 is represented by N=1 and the reflecting mirror 60 is represented by N=2), then, in the range of (N−1)·π≦θ≦N·−α, the distances Xd, Yd can be expressed by:

$$Xd = -Ad \cdot \cos(\theta - (N-1) \cdot \pi - \phi) \quad (1)$$

$$Yd = -Ad \cdot \sin(\theta - (N-1) \cdot \pi - \phi) \quad (2)$$

where Ad is a coefficient determined by the beam diameter of the laser beam L and the size of the reflecting mirrors 58, 60. The angle α represents an angle in which no image can be recorded when the laser beam L moves between the reflecting mirrors 58, 60. Therefore, in the range of N·π−α<θ<N·π, the distances Xd, Yd are established as a function capable of moving the laser beam L at a high speed to the next reflecting mirror 58, 60. FIG. 8 shows the relationship represented by the above equations (1), (2).

By shifting the position of the laser beam L in the X and Y directions as described above, images can efficiently be recorded on the photosensitive medium S with the two reflecting mirrors 58, 60.

Figure 9:
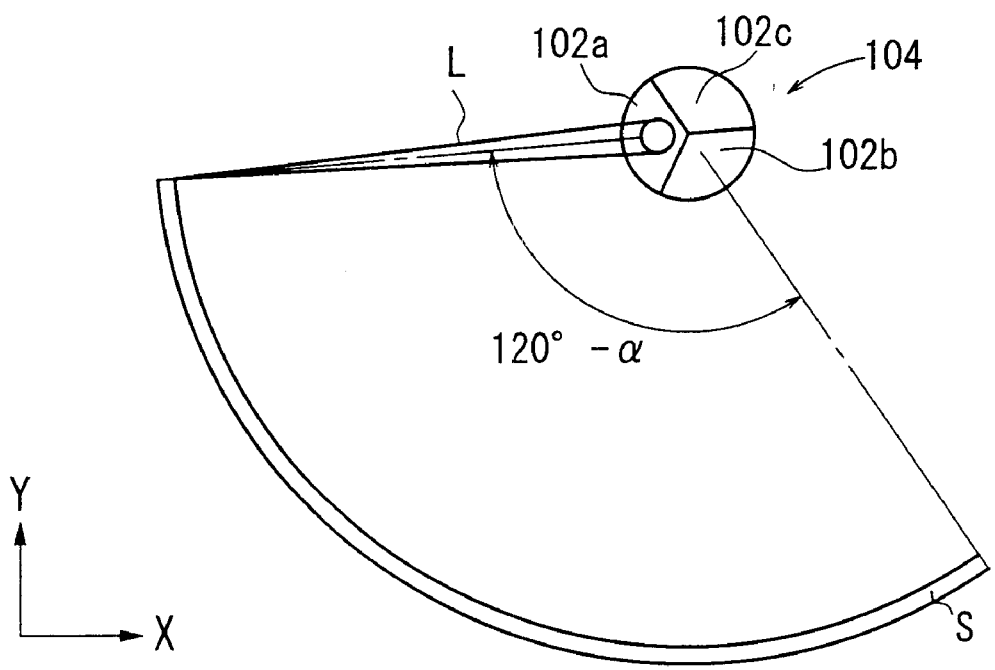
FIG. 9 is a is a schematic view showing how a laser beam is deflected by a spinner having three reflecting surfaces.

In another embodiment, as shown in FIG. 9, a spinner 104 having three reflecting mirrors 102a–102c may be used to record an image on a photosensitive medium S. In this case, the photosensitive medium S is mounted on a drum in an angular extend of (120°−α), and three consecutive scanning lines are recorded on the photosensitive medium S while the spinner 104 makes one revolution.

Figure 10:
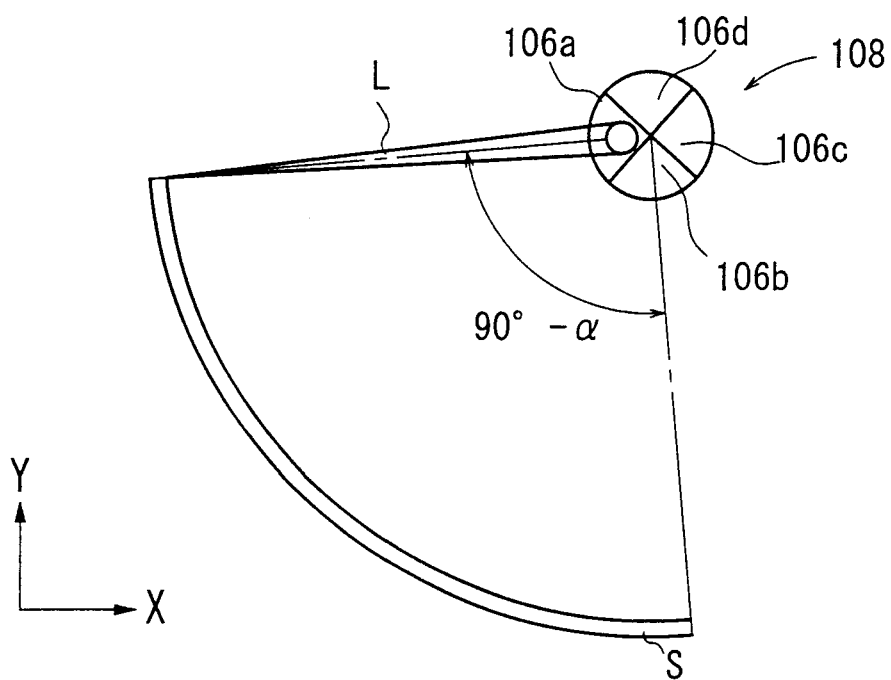
FIG. 10 is a schematic view showing how a laser beam is deflected by a spinner having four reflecting surfaces.

FIG. 10 shows still another embodiment in which a spinner 108 having four reflecting mirrors 106a–106d used to record an image on a photosensitive medium S. In this embodiment, the photosensitive medium S is mounted on a drum in an angular extend of (90°−α), and four consecutive scanning lines are recorded on the photosensitive medium S while the spinner 108 makes one revolution.

Generally, a spinner having m reflecting mirrors can record m scanning lines on a photosensitive medium while the spinner makes one revolution. The distance Xd in the X direction and the distance Yd in the Y direction, in the range of 2·(N−1)·π/m ≦θ≦2·N·π/m−α, can be expressed by:

$$Xd = -Ad \cdot \cos(\theta - 2 \cdot (N-1) \cdot \pi/m - \phi) \quad (3)$$

$$Yd = -Ad \cdot \sin(\theta - 2 \cdot (N-1) \cdot \pi/m - \phi) \quad (4)$$

By increasing the number of reflecting mirrors of the spinner, as described above, the number of scanning lines that can be recorded while the spinner makes one revolution can be increased, and the angular extent of the drum is reduced to allow the photosensitive medium S to be attached and detached with ease.

Figure 11:
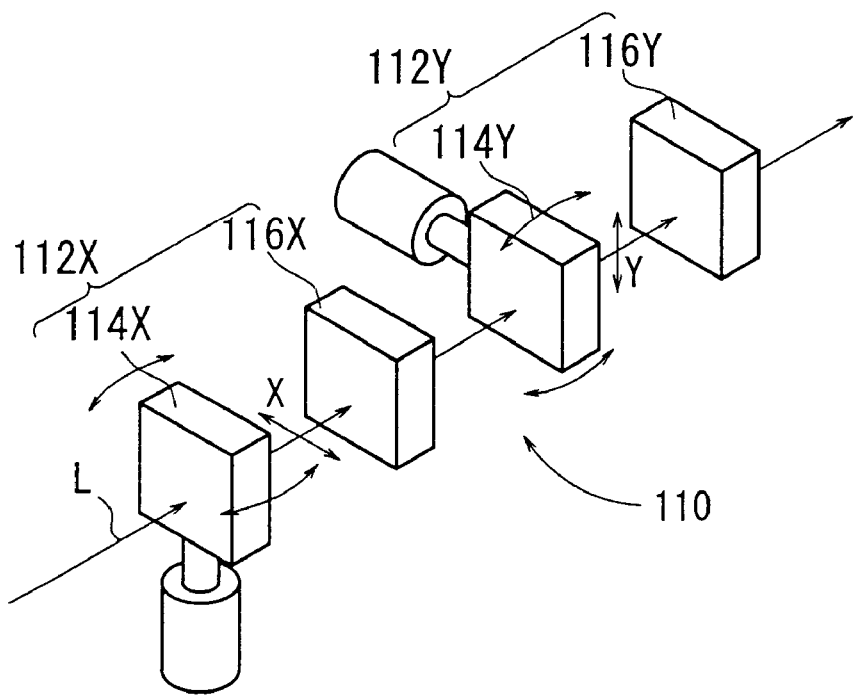
FIG. 11 is a perspective view of another light beam moving means for use in the internal-surface-scanning image recording apparatus according to the present invention.

FIG. 11 shows another light beam moving means. In FIG. 11, a beam shifter 110 comprises an X shifting module 112X and a Y shifting module 112Y. The X shifting module 112X comprises a parallel plane plate 114X swingable about the Y direction and a shifting device 116X which may comprise an AOD or an EOD. The parallel plane plate 114X can be angularly moved by a galvanometer mechanism or the like to shift the laser beam L in the X direction by the distance Xd expressed by the equation (3) above. The shifting device 116X corrects an error of the reflecting mirrors 58, 60 of the spinner 40. The Y shifting module 112Y comprises a parallel plane plate 114Y swingable about the X direction and a shifting device 116Y which may comprise an AOD or an EOD. The parallel plane plate 114Y can be angularly moved by a galvanometer mechanism or the like to shift the laser beam L in the Y direction by the distance Yd expressed by the equation (4) above. The shifting device 116Y corrects an error of the reflecting mirrors 58, 60 of the spinner 40. The parallel plane plates 114X, 114Y may alternatively be angularly movable by a piezoelectric device.

Figure 12:
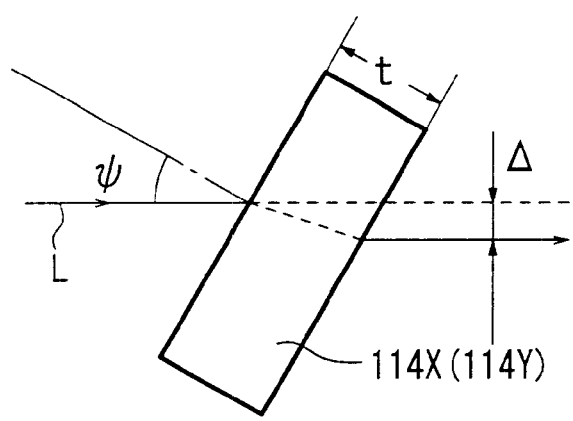
FIG. 12 is a view of a parallel plane plate for use in the internal-surface-scanning image recording apparatus shown in FIG. 11.

FIG. 12 shows the relationship between an angle ψ about which the parallel plane plates 114X, 114Y are turned from the applied laser beam L and the distance Δ by which the exiting laser beam L is shifted. If the parallel plane plates 114X, 114Y have a thickness t and a refractive index n, then the distance Δ is given by:

$$\Delta = t \cdot \sin(\psi - \arcsin(\sin\psi/n))/\cos(\arcsin(\sin\psi/n)) \quad (5)$$

From the equations (3) through (5), it can be seen that when the angular movement of the parallel plane plates 114X, 114Y is controlled such that Δ=Xd or Δ=Yd, the laser beam L can be applied to the reflecting mirrors 58, 60 at constant positions thereon.

Figure 13:
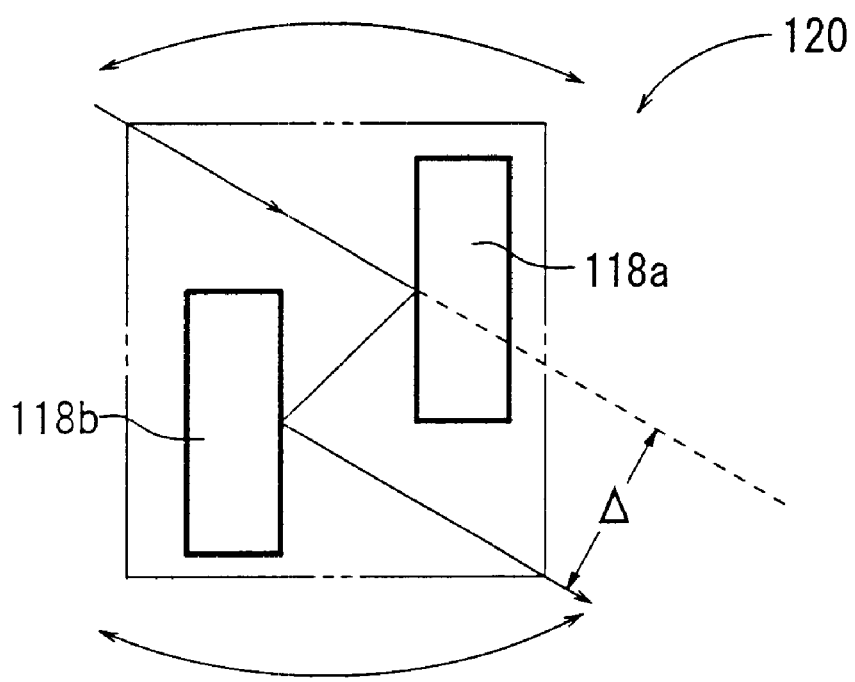
FIG. 13 is a perspective view of still another light beam moving means for use in the internal-surface-scanning image recording apparatus according to the present invention.

As shown in FIG. 13, a shifting module 120 comprising two parallel reflecting mirrors 118a, 118b may be employed to shift the laser beam L by the distance Δ in the direction in which the parallel reflecting mirrors 118a, 118b are turned.

Figure 14:
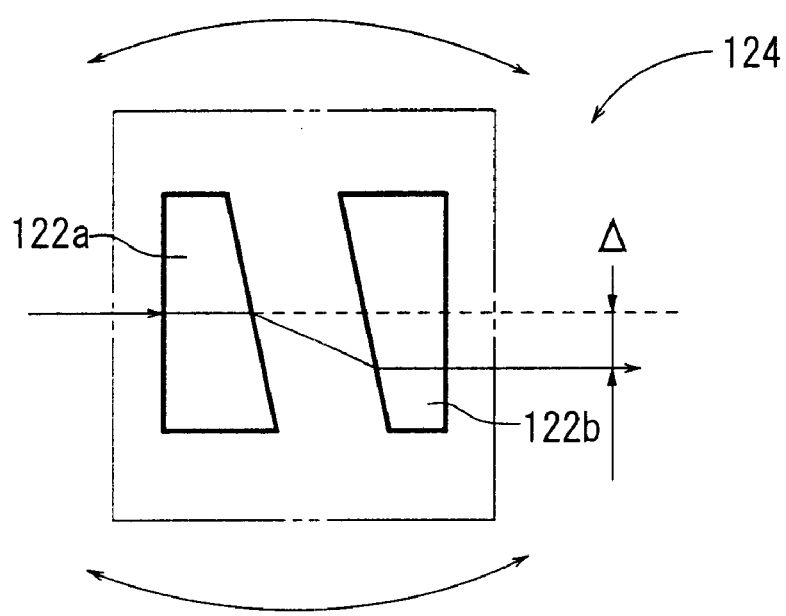
FIG. 14 is a perspective view of yet another light beam moving means for use in the internal-surface-scanning image recording apparatus according to the present invention.

As shown in FIG. 14, a shifting module 124 comprising two transparent wedge plates 122a, 122b may alternatively be employed to shift the laser beam L by the distance A in the direction in which the transparent wedge plates 122a, 122b are turned.

Figure 15:
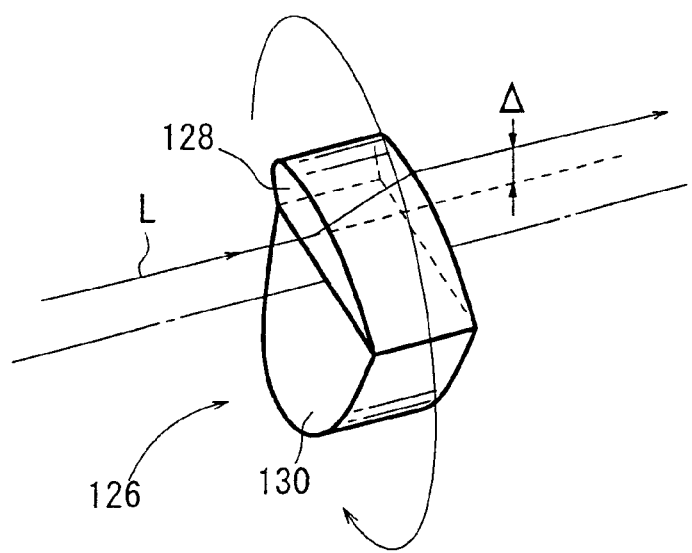
FIG. 15 is a perspective view of yet still another light beam moving means for use in the internal-surface-scanning image recording apparatus according to the present invention.
Figure 16:
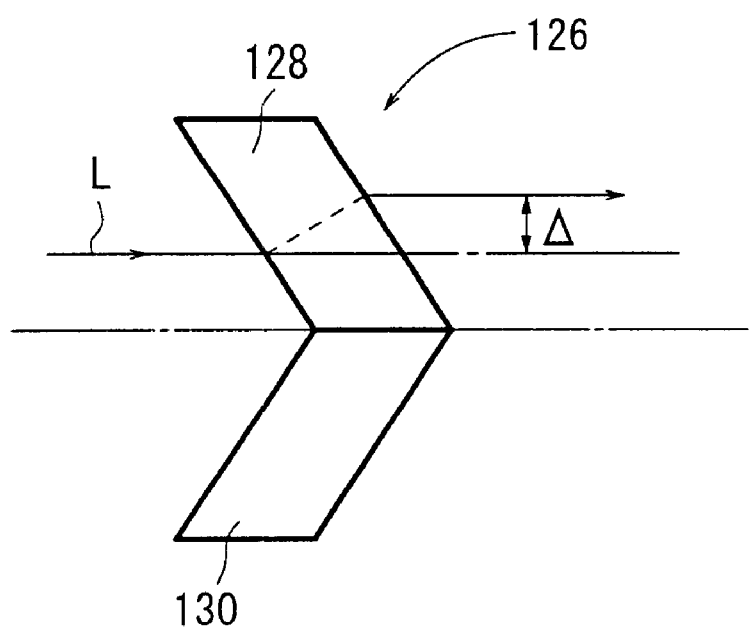
FIG. 16 is a side elevational view of the light beam moving means shown in FIG. 15.

FIGS. 15 and 16 show yet still another light beam moving means which comprises a shifting module 126. The shifting module 126 is arranged for use in combination with the spinner 40 having the two reflecting mirrors 58, 60. The shifting module 126 comprises two inclined semicircular parallel plane plates 128, 130 joined to each other at their diametrical surfaces. If the angle formed between the optical axis of the applied laser beam L and lines normal to the entrance surfaces of the parallel plane plates 128, 130 is represented by ψ, then the distance Δ by which the exiting laser beam L is shifted is expressed by the above equation (5). While the shifting module 126 is rotating 360°, the exiting laser beam L is turned 180° by the parallel plane plate 128 while being shifted the distance Δ, and thereafter returns to the origin, and is turned 180° by the parallel plane plate 130 while being shifted the distance Δ. The above operation of the shifting module 126 is repeated.

By rotating the shifting module 126 in synchronism with the spinner 40, the laser beam L can be applied to the reflecting mirrors 58, 60 at the same position thereon. With the shifting module 126 of the above construction being used, it is not necessary to employ the two X and Y shifting modules 42X, 42Y according to the embodiment shown in FIG. 2, and the range (angle α) in which no image can be recorded by the laser beam L can be reduced to the level of the beam diameter for more efficient image recording operation.

Figure 17:
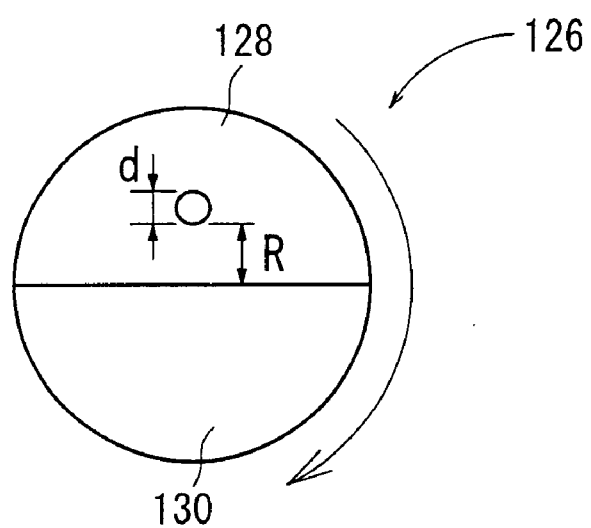
FIG. 17 is a front elevational view of the light beam moving means shown in FIG. 15.

As shown in FIG. 17, if a laser beam L having a beam diameter d is applied to the shifting module 126 at a position that is spaced a distance R from the center of the shifting module 126, then the ratio Ta of time in which the laser beam L passes the junction between the parallel plane plates 128, 130 is expressed as follows:

$$Ta = d/(\pi \cdot R) \quad (6)$$

As the position where the laser beam L is applied is spaced more widely from the center of the shifting module 126, the time required for the laser beam L to pass through the junction between the parallel plane plates 128, 130 is shortened. Therefore, it is preferable to increase the distance R in order to reduce the range (angle α) in which no image can be recorded by the laser beam L.

The shifting module 126 has been described as being applied in combination with the spinner 40 having the two reflecting mirrors 58, 60. However, the shifting module 126 may have m parallel plane plates disposed on one circumference and may be applied to a spinner having m reflecting mirrors.

Figure 18:
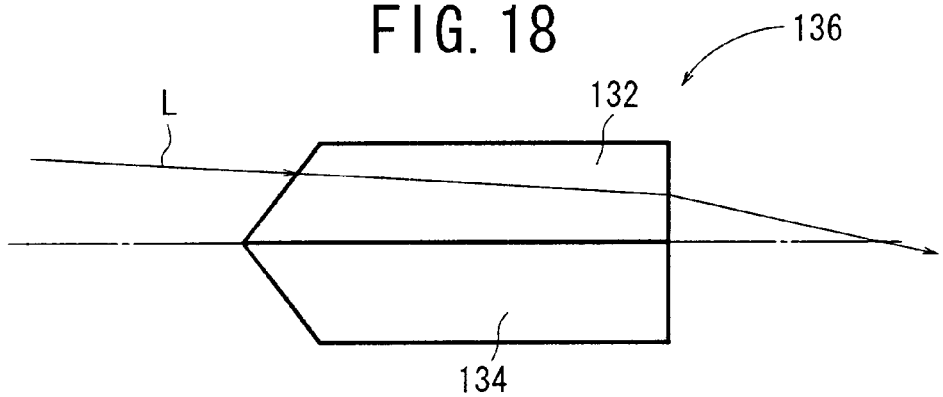
FIG. 18 is a perspective view of a further light beam moving means for use in the internal-surface-scanning image recording apparatus according to the present invention.

Instead of the shifting module 126 having the parallel plane plates 128, 130 shown in FIGS. 15 through 17, a shifting module 136 may comprise two joined prisms 132, 134 having entrance surfaces inclined to the optical axis of the laser beam L, as shown in FIG. 18. The shifting module 136 is rotated in synchronism with the spinner 40. If the shifting module 136 is of an elongate structure along the optical axis of the laser beam L, then an error of the deflected angle of the laser beam L in the direction in which it exits the shifting module 126 and an error of the position where the laser beam L is applied to the photosensitive medium S can be reduced.

In the above embodiments, the single laser beam L is used to record an image on the photosensitive medium S. However, the principles of the present invention are also applicable to an apparatus in which a plurality of laser beams L are simultaneously supplied to the spinner to record a plurality of scanning lines simultaneously on the photosensitive medium S.

Although certain preferred embodiments of the present invention have been shown and described in detail, it should be understood that various changes and modifications may be made therein without departing from the scope of the appended claims.

What is claimed is:

1. An internal-surface-scanning image recording apparatus for applying a light beam modulated with image information to a photosensitive medium mounted on an inner circumferential surface of a partly cylindrical drum to record an image on the photosensitive medium, comprising:

a spinner having a plurality of reflecting mirrors disposed around an axis, for reflecting the light beam with the reflecting mirrors which rotate about the axis to the photosensitive medium for thereby scanning the photosensitive medium with the light beam; and light beam moving means disposed upstream of said spinner with respect to the direction of travel of the light beam, for moving the optical axis of the light beam depending on the speed at which the reflecting mirrors move and the direction in which the reflecting mirrors move.

2. An internal-surface-scanning image recording apparatus according to claim 1, wherein said drum comprises a partly cylindrical body which angularly extends an angle of 180° at most about the axis thereof, and said spinner has as many reflecting mirrors as depending on said angle of 180°.

3. An internal-surface-scanning image recording apparatus according to claim 1, wherein said reflecting mirrors are arranged symmetrically with respect to said axis.

4. An internal-surface-scanning image recording apparatus according to claim 1, wherein said light beam moving means comprises:

first moving means for translating the optical axis of said light beam in a first direction; and second moving means for translating the optical axis of said light beam in a second direction, which is perpendicular to said first direction;

the arrangement being such that said optical axis of said light beam is moved in a direction corresponding to the direction in which the reflecting mirrors move, by said first moving means and said second moving means.

5. An internal-surface-scanning image recording apparatus according to claim 4, wherein said first moving means or said second moving means comprises an acousto-optical deflector.

6. An internal-surface-scanning image recording apparatus according to claim 4, wherein said first moving means or said second moving means comprises an electro-optical deflector.

7. An internal-surface-scanning image recording apparatus according to claim 4, wherein said first moving means or said second moving means comprises a parallel plane plate movable in synchronism with rotation of said spinner.

8. An internal-surface-scanning image recording apparatus according to claim 4, wherein said first moving means or said second moving means comprises a pair of reflecting mirrors angularly movable in synchronism with rotation of said spinner.

9. An internal-surface-scanning image recording apparatus according to claim 4, wherein said first moving means or said second moving means comprises a pair of wedge plates angularly movable in synchronism with rotation of said spinner.

10. An internal-surface-scanning image recording apparatus according to claim 1, wherein said light beam moving means comprises as many parallel plane plates as the number of the reflecting mirrors of said spinner, each of said parallel plane plates being inclined at a predetermined angle to the optical axis of said light beam and rotatable in synchronism with said spinner.

11. An internal-surface-scanning image recording apparatus according to claim 10, wherein said light beam moving means has correcting means for correcting an error of a set angle at which each of said parallel plane plates is inclined to said light beam by moving the optical axis of the light beam depending on the speed at which the reflecting mirrors move and the direction in which the reflecting mirrors move.

12. The apparatus of claim 1, wherein the light beam moving means adjusts the light beam to apply light to the plurality of reflecting mirrors at substantially constant positions.

13. The apparatus of claim 12, wherein for each or the plurality of reflecting mirrors, the light beam is applied to a central portion of each mirror.

14. The apparatus of claim 2, wherein the light beam is modulated to record multiple consecutive lines during one rotation of the spinner.

15. The apparatus of claim 14, wherein, during the one rotation of the spinner, the light beam is not modulated during a time interval corresponding to movement of the spinner through an angle $\alpha$, where $\alpha<90°$ and corresponds to movement of the light beam between central portions of adjacent faces of the plurality of reflecting mirrors.

16. An internal-surface-scanning image recording apparatus according to claim 1, wherein a scanning line on the photosensitive medium formed by the light beam scanning the photosensitive medium is not deflected in the direction perpendicular to a main scanning direction.

17. An internal-surface-scanning image recording apparatus according to claim 1, wherein a scanning line on the photosensitive medium formed by the light beam scanning the photosensitive medium is linear.

18. An internal-surface-scanning image recording apparatus according to claim 1, wherein an amount of deflection of the light beam is varied in synchronism with an angular displacement of the spinner.

* * * * *